United States Patent Office 3,445,357
Patented May 20, 1969

3,445,357
PROCESS FOR PREPARING CYCLIC
ORGANIC COMPOUNDS
Gary W. Griffin and Haukur Kristinsson, New Orleans,
La., assignors to Research Corporation, New York,
N.Y., a non-profit corporation of New York
No Drawing. Filed June 15, 1966, Ser. No. 557,622
Int. Cl. C07c 1/20, 3/24; B01j 1/10
U.S. Cl. 204—158                                    5 Claims This invention relates to a novel method for the preparation of cyclic organic compounds. In one specific aspect the invention relates to the preparation of cyclopropane and cyclopropene compounds.

As disclosed in U.S. Patent 3,074,984, compounds containing a cyclopropyl group have a wide variety of uses. The phenylcyclopropane and phenylcyclopropene compounds prepared by the process of the present invention are particularly useful as additives for liquid hydrocarbon fuels. In addition, the phenylcyclopropene compounds undergo conventional olefin reactions including reduction to the corresponding phenylcyclopropane compounds by hydrogenation in the presence of a metal catalyst such as finely divided nickel powder.

Compounds which contain the cyclopropyl group have been prepared by the pyrolysis of pyrazolines, by the reaction of 1,3-dihaloalkanes with divalent metals and by the reaction of alkyl monohalides, such as neopentyl chloride, with alkali metals. Cyclopropanes have also been obtained by the reaction of an olefin with diazomethane or with a trihalomethane in the presence of an alkali metal alkoxide. These methods frequently give poor yields of the cyclopropane product, particularly in the case of polyaryl compounds, and often result in difficult to resolve complex reaction mixtures.

We have discovered a convenient method for the generation of phenylcarbenes and their utilization in the preparation of cyclic organic compounds.

It is therefore, a principal object of the present invention to provide a novel method for the preparation of phenylcarbenes.

It is another object of the invention to provide a new method for the synthesis of cyclic highly strained organic compounds.

It is further object of the present invention to provide an improved method for the preparation of monocarbocyclic-arylcyclopropane and cyclopropene compounds.

In its broadest aspect, the present invention is a method for the preparation of monocarbocyclicarly carbenes which comprises irradiating stilbene oxide or a substituted stilbene oxide with ultraviolet light. In one specific aspect, the present invention is a method for the preparation of monocarbocyclicaryl-cyclopropane and cyclopropene compounds which comprises irradiating stilbene oxide or a substituted stilbene oxide with ultraviolet light in the presence of a lower alkene or a lower alkyne.

According to the present invention, phenylcarbenes are produced by the action of ultraviolet light on stilbene oxide (but not styrene oxide), triphenylethylene oxide, tetraphenylethylene oxide and other substituted stilbene oxides. Without limiting our invention to any particular theoretical mode of operation, phenylcarbene formation is postulated to occur as indicated in the following equations:

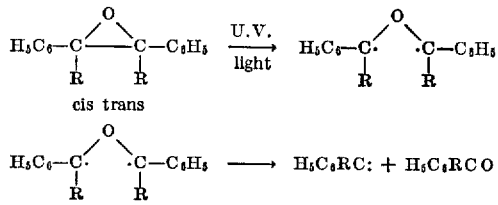

In the above equations each R is either hydrogen, lower alkyl (containing 1–6 carbon atoms) or phenyl. The intermediate diradical can decompose by cleavage of either carbon-oxygen bond. Usually both R's are the same, the intermediate diradical is symmetrical and only one set of products is obtained. When the R's are not the same, two phenylcarbene and carbonyl compounds are obtained.

Phenylcarbenes, when generated in the presence of a compound having carbon-carbon unsaturation, react with the unsaturated linkage to form a cyclic organic compound. The reaction with alkenes is illustrated by means of the following equation:

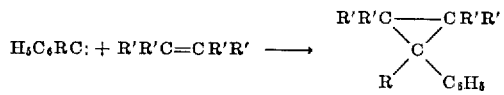

The reaction with alkynes is illustrated by means of the following equation:

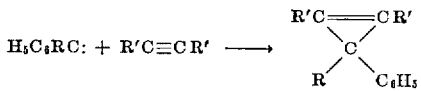

In the above equations each R' may be hydrogen or a lower alkyl group containing 1 to 4 carbon atoms. It is apparent that with alkyne starting materials there can be only two R' substituents but with alkene starting materials there can be four R' substituents in the final product. R is either hydrogen, lower alkyl or phenyl as before.

Irradiation of the reactant stilbene oxide or substituted stilbene oxide is most conveniently effected in serum-capped quartz test tubes. When it is desired to utilize the reaction in the preparation of a cyclic organic compound, the reactant unsaturated compound is most conveniently employed as the solvent. If the reactant unsaturated compound is particularly volatile under reaction conditions, a thick walled quartz vessel equipped with a pressure fitting is employed. The reaction vessel is degassed several times at low temperatures prior to irradiation in order to ensure complete removal of oxygen. A conventional mercury vapor lamp is employed as the source of ultraviolet radiation; improved results are obtained if the reaction mixture is stirred during irradiation.

It is necessary that irradiation be terminated prior to complete disappearance of the stilbene oxide reactant. Otherwise, the product cyclopropanes and cyclopropenes begin to absorb the ultraviolet radiation and isomerize to olefins. Complete separation of the product from the oxetanes formed as byproducts is readily accomplished by a single short-path distillation under reduced pressure. Aside from the oxetanes, only trace amounts of other nonpolymeric byproducts are obtained.

Irradiation of trans-stilbene oxide in 2-methyl-2-butene for 10 hours gave high yields of equimolar amounts of cis- and trans-2,2,3-trimethyl-1-phenylcyclopropane. The oxetane from benzaldehyde and 2-methyl-2-butene was also isolated. Tetraphenylethane and cis- and trans-2,2,3-trimethyl-1-phenylcyclopropane were obtained when triphenylethylene oxide was irradiated under similar conditions in a benzene solution of 2-methyl-2-butene or in the neat olefin.

In the runs summarized below, the time of irradiation was 50 hours. Starting with 0.3 molar stilbene oxide dissolved in the indicated reactant olefin, about 20–30% of the stilbene oxide remained unreacted.

| Reactant olefin | Cyclopropane product | Yield, percent |
|---|---|---|
| Isobutene | 1,1-dimethyl-2-phenyl- | 60 |
| Cis-2-butene | 1,2-dimethyl-3-phenyl- | 65 |
| Trans-2-butene | do | 65 |
| 2-methyl-2-butene | 1,1,2-trimethyl-3-phenyl- | 75 |
| 2-methyl-1-butene | 1-methyl-1-ethyl-3-phenyl- | 70 |
| 2,3-dimethyl-2-butene | 1,1,2,2-tetramethyl-3-phenyl- | 60 |

Pairs of epimeric cyclopropanes were obtained by reaction of phenylcarbene generated from stilbene oxide with the noncentrosymmetric olefins cis-2-butene, 2-methyl-2-butene and 2-methyl-1-butene. The isomer having the largest number of alkyl groups cis to the phenyl substituent was designated as the syn isomer and the alternate configuration was designed anti. The isomers were separated by gas-liquid chromatography and identified by comparison of their nuclear magnetic resonance spectra with those reported in the literature. The ratios obtained were as follows.

| Reactant olefin: | Syn:anti ratio |
| --- | --- |
| cis-2-butene | 0.60–0.65 |
| 2-methyl-2-butene | 0.95–1.0 |
| 2-methyl-1-butene | 0.75–0.85 |

Ultraviolet irradiation in these experiments was effected under conditions which precluded significant photoisomerization subsequent to addition. The time of irradiation varied from 15 to 30 minutes but the observed syn:anti ratio did not change even after irradiation of stilbene oxide in cis-2-butene for a period exceeding 50 hours. In the case of 2-methyl-2-butene, the observed low syn:anti ratio is not attributable to photoequilibration subsequent to addition since the photostationary state has been shown to favor the syn isomer.

Phenylcarbene generated from 0.3 molar stilbene irradiated for 50 hours in 2-butyne gave a 65% yield of 1,2-dimethyl-3-phenylcyclopropene. The resultant phenylcyclopropene, like the phenylcycloprene products, should not be irradiated in the absence of a reactant epoxide. In a side reaction, benzaldehyde reacted with 2-butyne to give an unstable oxetane which isomerized to 3-methyl-4-phenylbutenone.

Ultraviolet irradiation of stilbene in benzene, in the absence of other more reactive unsaturated compounds, gave phenylcycloheptatriene. Such substituted cycloheptatrienes are oxidized, e.g. by means of potassium permanganate, to the corresponding tropolones which exhibit bactericidal and antifungal activity.

While the present invention has been illustrated by means of stilbene oxide, substituted stilbene oxides as described above, behave in a similar manner.

We claim:

1. A method for the preparation of compounds having the formula:

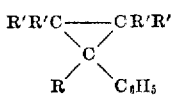

wherein each R' is hydrogen or a lower alkyl radical having 1 to 4 carbon atoms and R' is hydrogen, lower alkyl or phenyl, which comprises irradiating a compound of the formula:

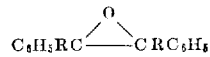

with ultraviolet light in the presence of a compound having the formula R'R'C=CR'R'.

2. A method for the preparation of compounds having the formula:

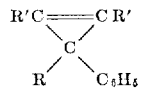

wherein each R' is hydrogen or a lower alkyl radical having 1 to 4 carbon atoms and R is hydrogen, lower alkyl or phenyl, which comprises irradiating a compound of the formula:

with ultraviolet light in the presence of a compound having the formula R'C≡CR'.

3. A method according to claim 2 wherein stilbene oxide is irradiated with ultraviolet light in the presence of a butene.

4. A method according to claim 3 wherein stilbene oxide is irradiated with ultraviolet light in the presence of a butyne.

5. A method for the preparation of phenylcycloheptatriene which comprises irradiating a solution of stilbene oxide in benzene with ultraviolet light.

References Cited

Kristinsson et al., J.A.C.S., vol. 80 (June 1958), 2844–52.

HOWARD S. WILLIAMS, *Primary Examiner.*

U.S. Cl. X.R.

204—162

PO-1050
(5/69)

UNITED STATES PATENT OFFICE
CERTIFICATE OF CORRECTION

Patent No. 3,445,357      Dated May 20, 1969

Inventor(s) Gary W. Griffin and Haukur Kristinsson

It is certified that error appears in the above-identified patent and that said Letters Patent are hereby corrected as shown below:

In Claim 3, line 1, "2" should read --1--. In Claim 4, line 1, "3" should read --2--.

SIGNED AND
SEALED

AUG 26 1969